INVENTOR
RICHARD L. JOHNSON
BY Charles E. McTiernan
ATTORNEY

Sept. 4, 1956 R. L. JOHNSON 2,761,622

TOTALIZING DEVICE

Filed Dec. 31, 1952. 11 Sheets-Sheet 2

INVENTOR
RICHARD L. JOHNSON

BY Charles E. McTiernan
ATTORNEY

Sept. 4, 1956 R. L. JOHNSON 2,761,622

TOTALIZING DEVICE

Filed Dec. 31, 1952 11 Sheets-Sheet 3

INVENTOR
RICHARD L. JOHNSON

BY Charles E. McTiernan

ATTORNEY

Sept. 4, 1956 R. L. JOHNSON 2,761,622

TOTALIZING DEVICE

Filed Dec. 31, 1952 11 Sheets-Sheet 4

INVENTOR
RICHARD L. JOHNSON

BY Charles E. McTiernan

ATTORNEY

INVENTOR
RICHARD L. JOHNSON
BY
Charles C. McTiernan
ATTORNEY

Sept. 4, 1956 R. L. JOHNSON 2,761,622

TOTALIZING DEVICE

Filed Dec. 31, 1952 11 Sheets-Sheet 6

INVENTOR
RICHARD L. JOHNSON
BY
Charles E. McTiernan
ATTORNEY

Sept. 4, 1956 R. L. JOHNSON 2,761,622
TOTALIZING DEVICE
Filed Dec. 31, 1952 11 Sheets-Sheet 7

INVENTOR
RICHARD L. JOHNSON
BY
Charles E. McTiernan
ATTORNEY

Sept. 4, 1956 R. L. JOHNSON 2,761,622

TOTALIZING DEVICE

Filed Dec. 31, 1952 11 Sheets-Sheet 8

INVENTOR
RICHARD L. JOHNSON
BY
Charles E. McTiernan
ATTORNEY

Sept. 4, 1956 R. L. JOHNSON 2,761,622

TOTALIZING DEVICE

Filed Dec. 31, 1952 11 Sheets-Sheet 9

INVENTOR
RICHARD L. JOHNSON
BY
Charles E. McTiernan
ATTORNEY

Sept. 4, 1956

R. L. JOHNSON 2,761,622

TOTALIZING DEVICE

Filed Dec. 31, 1952

11 Sheets-Sheet 10

INVENTOR
RICHARD L. JOHNSON
BY
Charles E. McTiernan
ATTORNEY

Sept. 4, 1956 R. L. JOHNSON 2,761,622

TOTALIZING DEVICE

Filed Dec. 31, 1952 11 Sheets-Sheet 11

INVENTOR.
RICHARD L. JOHNSON

BY

Charles E. McTiernan

ATTORNEY

United States Patent Office 2,761,622
Patented Sept. 4, 1956

2,761,622

TOTALIZING DEVICE

Richard L. Johnson, Wappingers Falls, N. Y., assignor to International Business Machines Corporation, New York, N. Y., a corporation of New York Application December 31, 1952, Serial No. 328,885

6 Claims. (Cl. 235—61.6)

Figure 1:
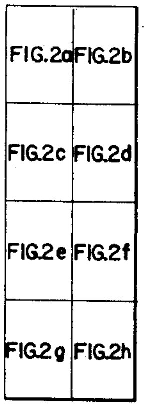

The present invention relates to apparatus for obtaining the summation of a plurality of amounts or factors.

The principal object of the invention is to provide apparatus for concurrently entering amounts digit by digit in a record card and storing same until the amount is entered and then reading out the stored amount into a multidenominational accumulator.

Another object of the invention is to provide apparatus for automatically entering in a record card either the progressive total or the final total of previously entered amounts as determined by a program or functional control device.

A further object of the invention is to provide apparatus for checking the accuracy of the total of entered amounts with the total of said amounts as obtained by other methods.

A still further object of the invention is to provide apparatus for checking the accuracy of a keyed amount with a previously entered amount prior to entering the latter into a record card.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a diagram showing the arrangement of Figures 2*a* to 2*h*, inclusive, necessary to present a complete circuit diagram.

Figures 2*a*, 2*b*, 2*c*, 2*d*, 2*e*, 2*f*, 2*g* and 2*h* when arranged as shown in Figure 1 is a wiring diagram of the electric circuits of the apparatus.

Figure 3:
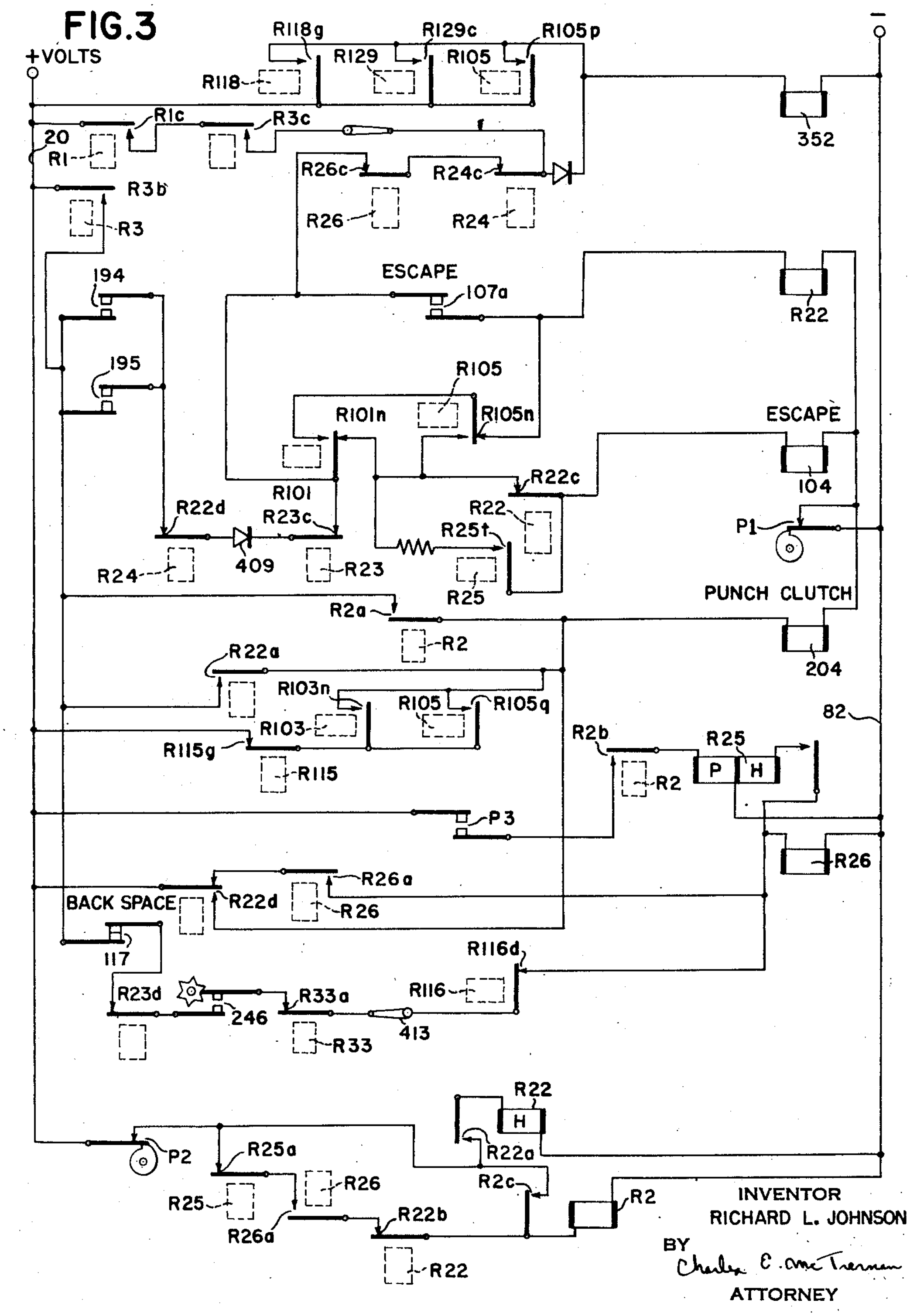

Figure 3 is a wiring diagram of the circuit which initiates punch clutch cycles.

Figure 4A:
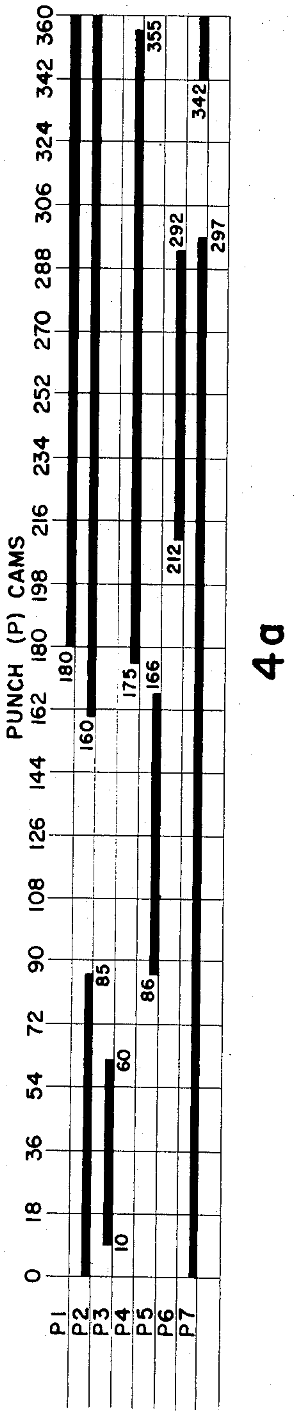
Figure 4B:
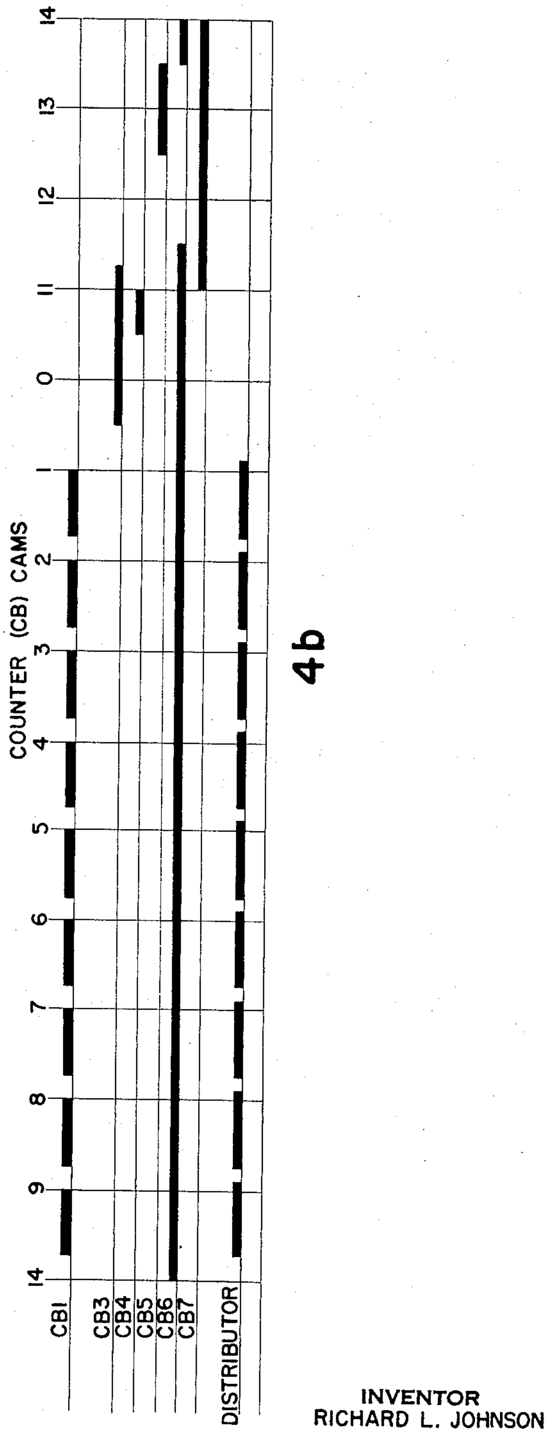

Figures 4*a* and 4*b* are timing diagrams showing the timing of the electrical impulses.

Figure 5:
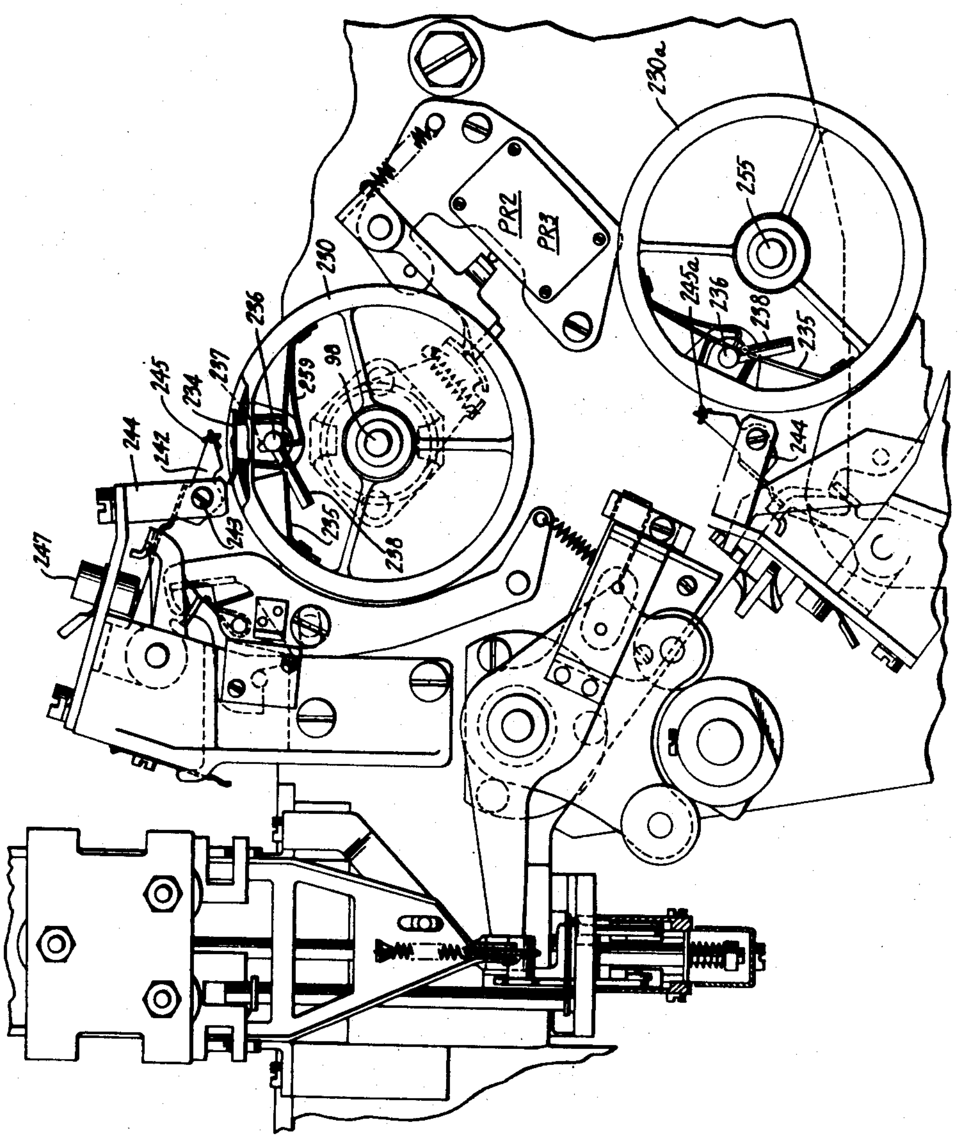

Figure 5 is a view showing the two program drums.

The mechanical ararngement of the card feeding mechanism, the card reading mechanism, the escape mechanism and the punch mechanism used in conjunction with the present invention is substantially the same as that found in the commercial machine known as "IBM Card Punch Type 024" which is also described and claimed in patent application Serial No. 103,224 of E. W. Gardinor et al., filed July 6, 1949, which issued on August 4, 1953, as Patent 2,647,581. In view of this fact, the mechanism of the aforementioned patent application will be described here briefly and only in as much detail as is necessary for an understanding of the present invention, and reference may be had to the aforementioned patent application for a more detailed explanation. Also, in those instances where mention is made of an element present in the Gardinor application reference characters used in said application will be employed with an indication of the figure in the Gardinor application wherein said element may be found. Attention is also directed to the fact that any relay or relay contacts mentioned herein and having a reference symbol below R100 will find its equivalent in the Gardinor application.

Before going into the detail of a circuit herein disclosed, it may be noted that certain portions of the Gardinor circuit depicted herein differ in minor respects from the corresponding portion of Gardinor application, although these differences do not result in any different function for that portion of the circuit. These differences represent minor refinements that have been added to show the actual circuit as used with the present invention. It is to be noted, of course, that similar circuits may be employed without departing from the novel subject matter disclosed herein.

It is believed that the present invention may be best set forth by describing the invention as actually employed with machine disclosed in the aforementioned Gardinor application. In those instances where the circuit elements of the Gardinor application become effective in conjunction with the circuit arrangement of the present invention, as previously mentioned, the reference numbers used to identify such circuit elements in the Gardinor application will be used.

The functioning of the apparatus disclosed in the Gardinor application is controlled in a manner as shall be made clearer subsequently by a pair of functional control devices in the form of perforated record cards which are wrapped around the drums 230 and 230*a* (Fig. 5). It is to be noted that Fig. 5 herein is substantially similar to Fig. 23 of the Gardinor et al. application.

Referring to Fig. 5, the shaft 98 which is part of the gear chain controlled by the escapement mechanism (not shown here), extends toward the rear of the machine and has removably mounted thereon a so-called program drum 230.

The drum 230 is arranged so that a standard size record card may be wrapped around it and held in place by the following devices. As seen in Fig. 5, a thin metallic strip 234 which extends longitudinally and is integral with the drum provides a slot into which one end of the card may be inserted. Blade springs 235 have one end of each secured to the inner wall of the drum and are normally biased so their free ends, which are sharpened, engage the under surface of the card ends to hold them in position. A rod 236 supported on the drum extends longitudinally and is provided with cam knobs 237 located so that, when the rod 236 is rocked into a particular position by means of handle 238, the springs 235 holding one end of the card will be cammed out of contact therewith so that this end of the card may be inserted or removed. In placing a program card about the drum 230, the parts are first brought to an initial position and one end of the card inserted between the drum and plate 234. While held in such position, rod 236 is rocked so that the springs 235 are released to engage and hold the inserted end and other knobs engage the springs associated with the opposite end to rock them away from plate 234.

The card is then wrapped around and the opposite end inserted in position, after which the rod 236 is rocked to its final position where the knobs 237 are out of engagement with the springs 235. A further detenting spring 239 is provided to resiliently maintain the rod 236 in positions to which it is moved.

As brought out in the aforementioned Gardinor et al. application, the rod 236 also serves as a driving connection between the shaft 98 and the drum 230.

A second drum exactly similar to that just explained is provided and also shown in Fig. 5, where it is designated 230*a* and is mounted on a shaft 255 in the same manner as drum 230. This shaft 255 is geared into the escapement chain, so that it rotates step by step in unison with the program drum 230 and traverses a set of sensing wheels designated 245*a* which are responsive to perforations in the perforated record or auxiliary program card as it passes a reading line to close contacts similar to the ones to be presently described for the program drum 230, and which will control circuits in a manner to be subsequently described.

Extending across the top of each of the drums is a row of sensing devices such as 245, for example, of which twelve are provided, one for each of the twelve rows of perforating positions in the card, and arranged so that as the drum and card thereon move step by step the card column will be at sensing position concurrently with the location of corresponding columns in the record card at the reading station. The star wheel sensing device is of the type shown and described in Patent No. 2,517,984, issued August 8, 1950, to J. M. Cunningham, wherein it is claimed, and a brief description thereof will be given herein.

For each row of perforating positions in the card, there is provided a lever 242 pivoted at 243 to a stationary block 244. Each lever has pivoted thereto a 5-point star wheel 245 which bears against the card on the drum 230 under the influence of a contact spring (not shown) which engages the opposite end of lever 242. With an imperforate portion of the card beneath the wheel 245, the wheel rests thereon and, as a perforation in the card moves by, a tooth of the wheel will roll therein to be carried along by the edges of the hole wherein the pivot point of the star-wheel is dropped toward the center of the drum, permitting rotation of the lever 242 and consequent movement of the contact spring into engagement with fixed contactor 247.

Where there are perforations in the same row in successive program card columns, the star-wheel 245 will drop into the first perforation and close the corresponding contacts. The wheel will then roll into the next perforation without elevating the pivot of the wheel and consequently said corresponding contacts will remain closed for the extent that there is a succession of adjacent perforations.

The card wrapped about drum 230 is called the program card and is provided with perforations in rows and columns so as to cause the contact spring to engage the contactor 247 at predetermined positions of the cards passing through the machine, and these contacts will complete circuits for controlling spacing, skipping and other functional operations much in the manner as described in the Gardinor et al. application.

The card wrapped around the drum 230*a* is also a program card (hereinafter referred to as an auxiliary program card in order to distinguish it from the program card wrapped around drum 230) which is also provided with perforations in order to cause the closing of corresponding contacts for the carrying out of certain functional operations as shall be made clearer subsequently.

*Circuit diagram*

It is also believed that the present invention may be best described with respect to some of the operations performed by the applicant's device with reference to the problem of initially entering the number 109. The circuit diagram will be described with the initial assumption that the program cards are standing in column 1 position and the detail card is standing in column 0 position. Operations to be described are: (1) concurrent adding and punching; (2) adding without punching; (3) subtraction; (4) total punching; (5) checking of an entered total; and (6) adding and checking from pins.

*Adding with punching*

In this operation the respective digits of the number 109 will be successively keyed in, causing the corresponding digit to be punched in a record card as well as being stored in a multidenominational counter. In order to carry out the assumed problem it is necessary that the auxiliary program card have the sixth and seventh index positions punched in the first column, while the "12" index position in the other program card will be punched in columns 2 and 3. Thus with the auxiliary program card standing in column 1 position, the corresponding star-wheel 245*a* (Fig. 5) will sense the "6" and "7" perforations entered therein causing a circuit to be established for energizing field size relays R108 and R109 (Fig. 2*g*), and at the same time also causing the accumulate relay R111 (Fig. 2*g*) to be energized. There are three field size relays, R108, R109 and R110, which are respectively representative of the digits 1, 2 and 4. These field size relays may be programmed by the punching of the "6," "7," and "8" index positions, either singly or in combination in the highest order column of the auxiliary program card in order to indicate the size of the field to be punched in the detail card. If the size of the field is one digit, the program card will be punched with a "6" to cause the energization of relay R108; if the size of the field is two digits, then the auxiliary program card will be punched with a "7" to cause the energization of the relay R109; if the size of the field is three digits, then the highest order column of the auxiliary program card will be punched with a "6" and "7" to cause the energization of the relays R108 and R109; if the size of the field is four digits, then the auxiliary program card will be punched with an "8" in the highest order column to cause the energization of the relay R110; if the size of the field is five digits, then the auxiliary program card will be punched with the "6" and "8" in the highest order column to cause energization of the relays R108 and R110. The programming for the remaining field sizes now becomes obvious and will not be set forth in detail. It is to be noted that at the time any of the field size relays R108, R109 and R110 become energized, the accumulate relay R111 will also be energized.

Figure 2A:
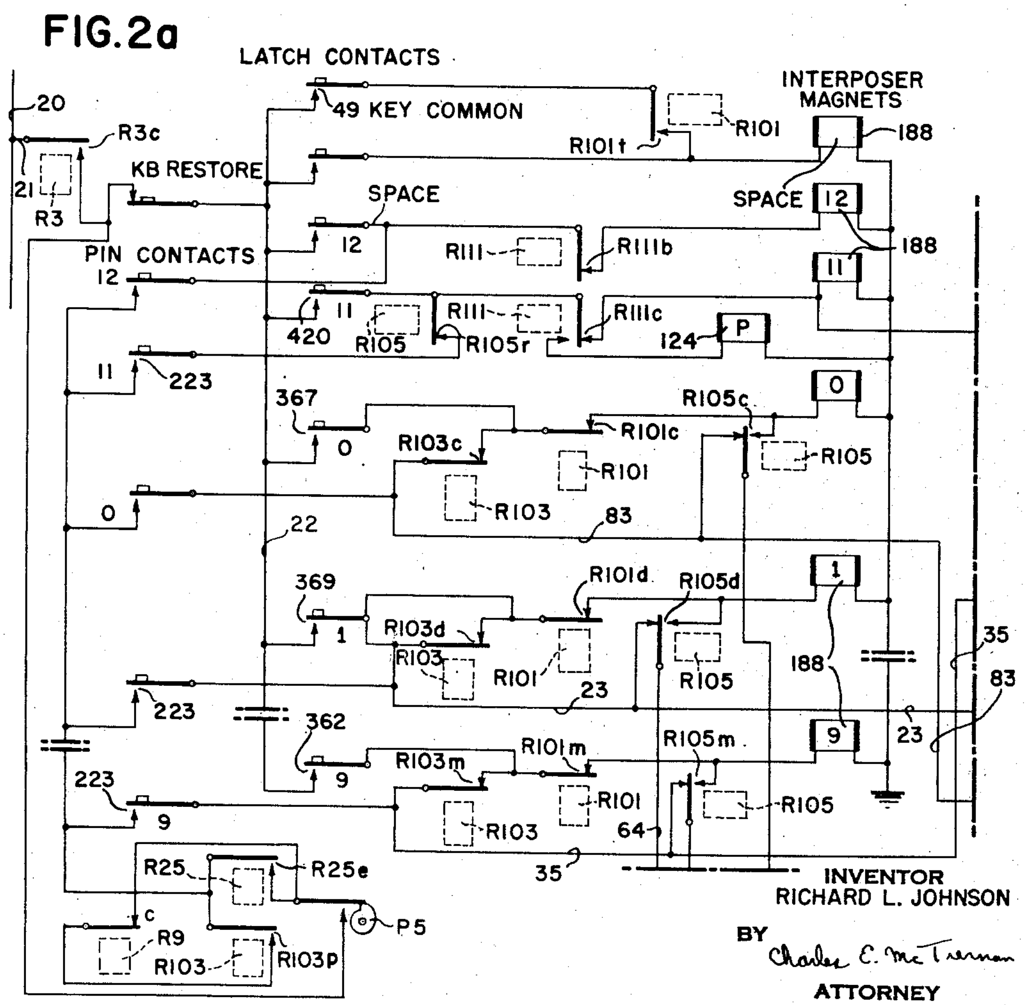

The operator will now commence to enter the highest order digit of the number 109 by depressing the 1 key causing the associated contacts 369 (Fig. 2*a*) to be closed. The closing of the contacts 369 will establish a pair of electrical circuits. One circuit will cause the energization of the 1 interposer magnet 188 (Fig. 2*a*). As brought out in the aforementioned Gardinor et al. patent application, and as not completely shown in this application, the energization of the interposer magnet unlatches its associated punch interposer 190 (Fig. 8 of the Gardinor application) which latches on the punch bail and closes the bail contacts 194 and 195 (Fig. 3 here). It is pointed out that Fig. 3 is a partial representation of the Gardinor circuit diagram as modified pursuant to the instant invention. As the interposer bail contacts 194 and 195 (Fig. 3) close they energize the escapement magnet 104, causing the program cards to escape to column 2, while the detail card will escape to column 1, as well as establishing a circuit for energizing the keyboard restore magnet 352. The circuit established for energizing the escapement magnet 104 and the restore magnet 352 may be traced as follows: conductor 20 (Fig. 3) coupled to a positive terminal of a source of potential (not shown), card lever contacts R3*b* now closed, interposer contacts 194 and 195 now closed, contacts R24*d* normally closed, rectifier 409, contacts R23*c* normally closed, parallel circuit consisting of contacts R101*n* and R22*c* as shown, magnet 104, normally closed contacts P1, and contacts R26*c* and R24*c* normally closed, rectifier, magnet 352 and then to the grounded conductor 82. When the escapement magnet 104 (Fig. 3) is energized, the escapement contact 107*a* (Fig. 3) closes to establish an obvious circuit for energizing the escape interlock relay R22. A hold circuit for relay R22 is established through its associated contacts R22*a* now closed by the cam controlled contacts P2. When relay R22 becomes energized the contacts R22*c* (Fig. 3) open to break the circuit for energizing the escapement magnet 104.

The energization of the escape interlock relay R22 closes the contacts R22*a* causing a circuit to be established for energizing the punch clutch magnet 204. The energization of the magnet 204 initiates a punch clutch cycle during which time the various P cams become effective in the order shown in the timing diagram of Fig. 4*a*. The digit 1 will be punched in column 1 of the detail card during this punch clutch cycle in a manner as described in the Gardinor application.

Figure 2B:
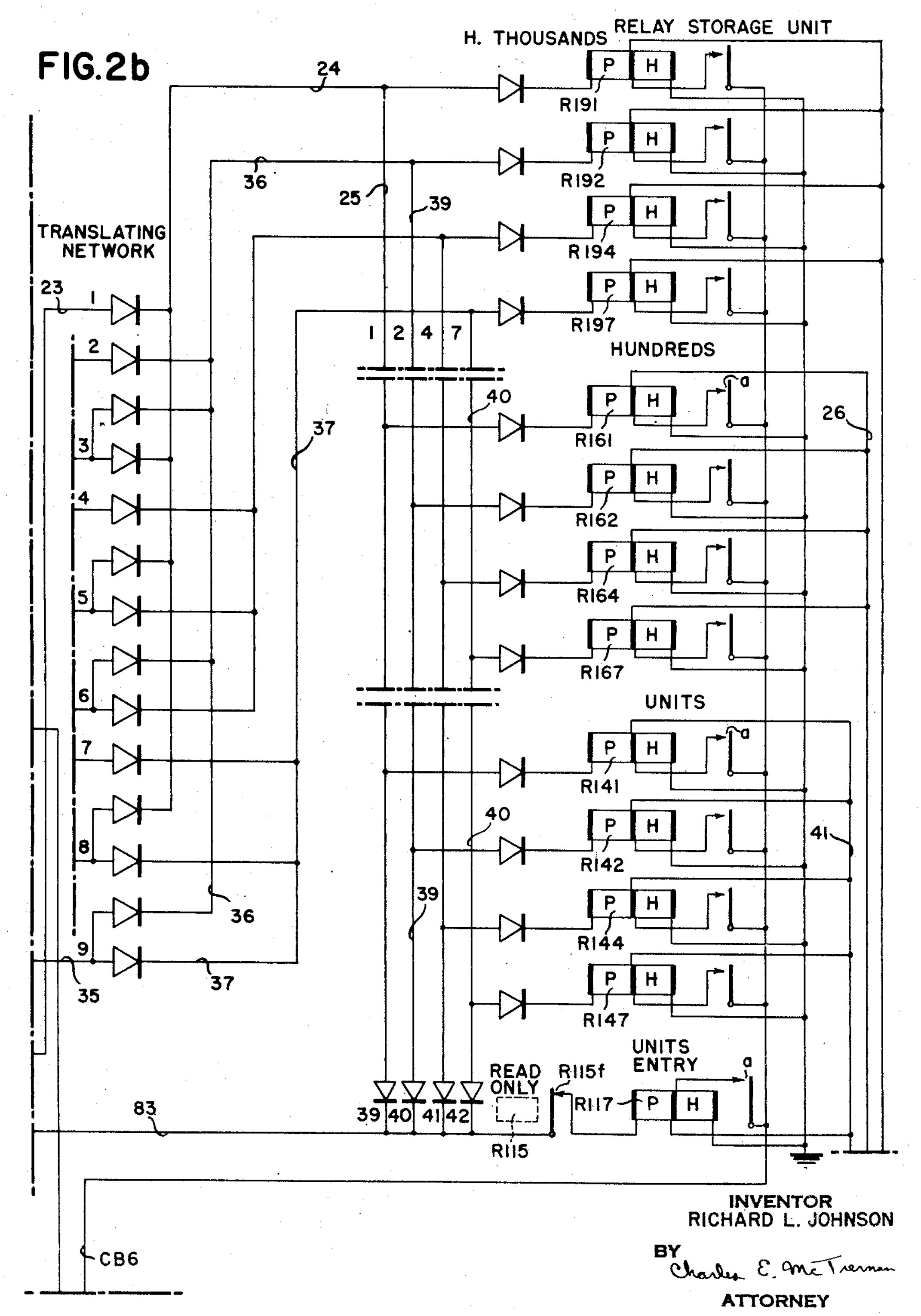
Figure 2C:
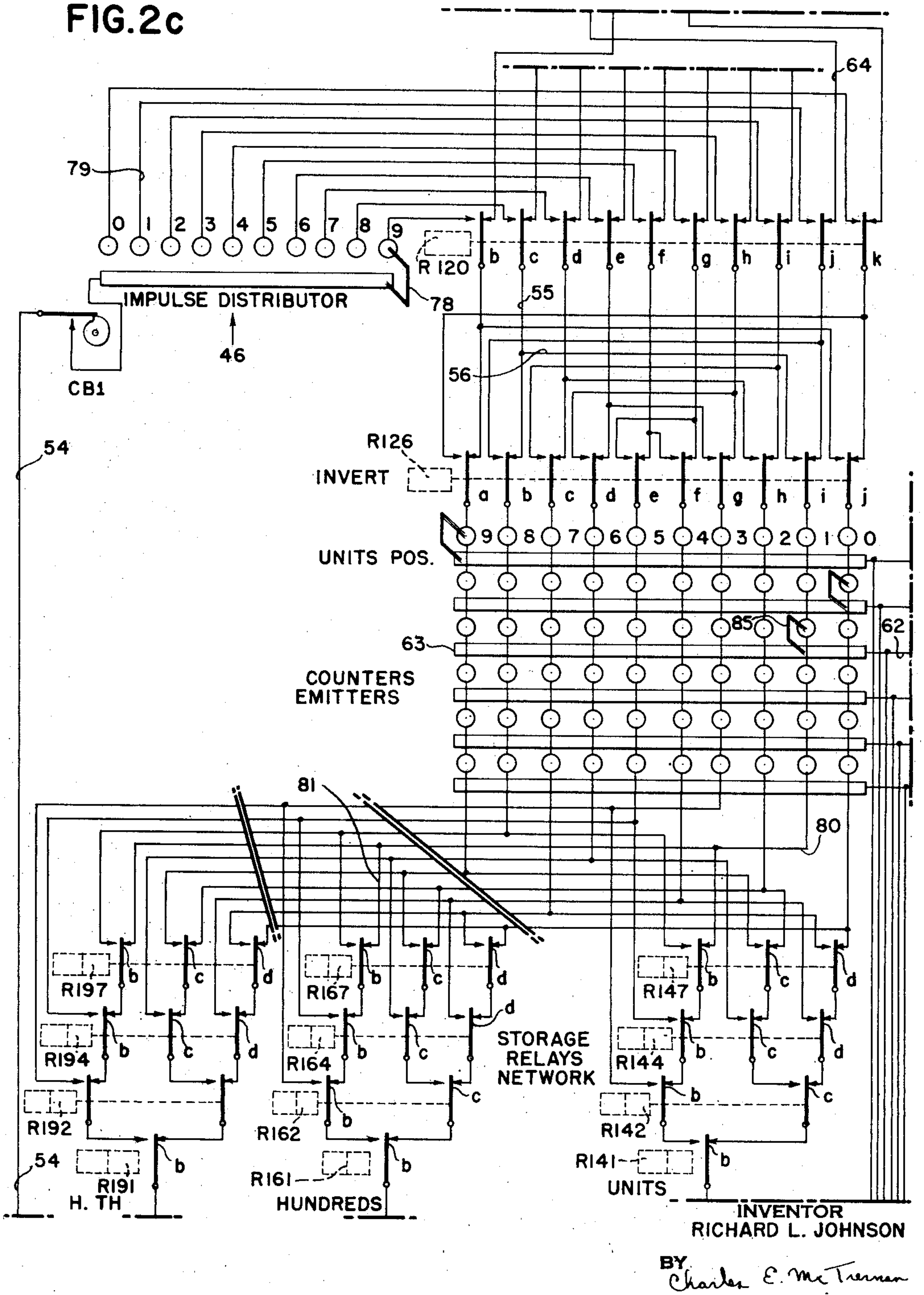
Figure 2D:
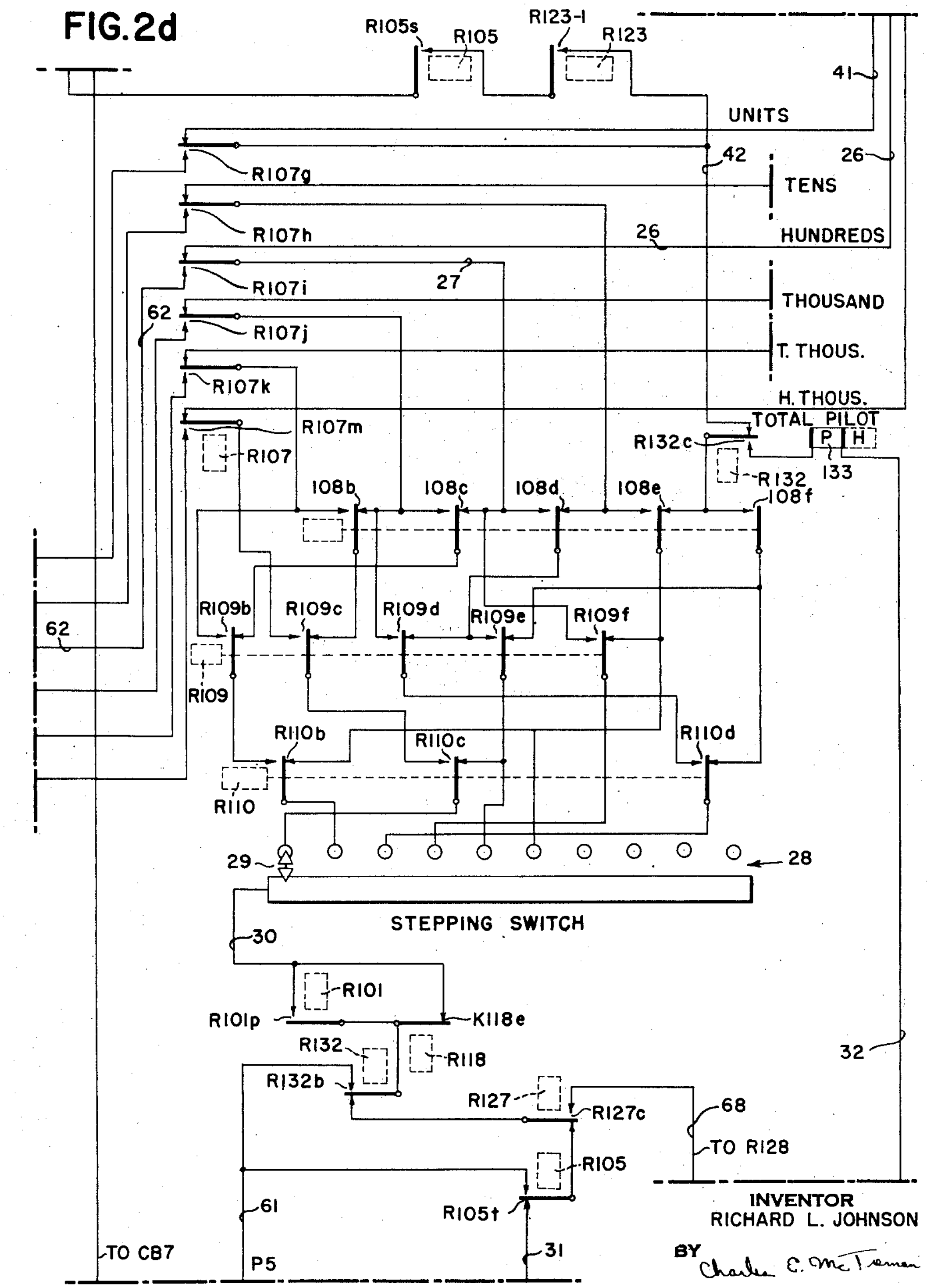
Figure 2E:
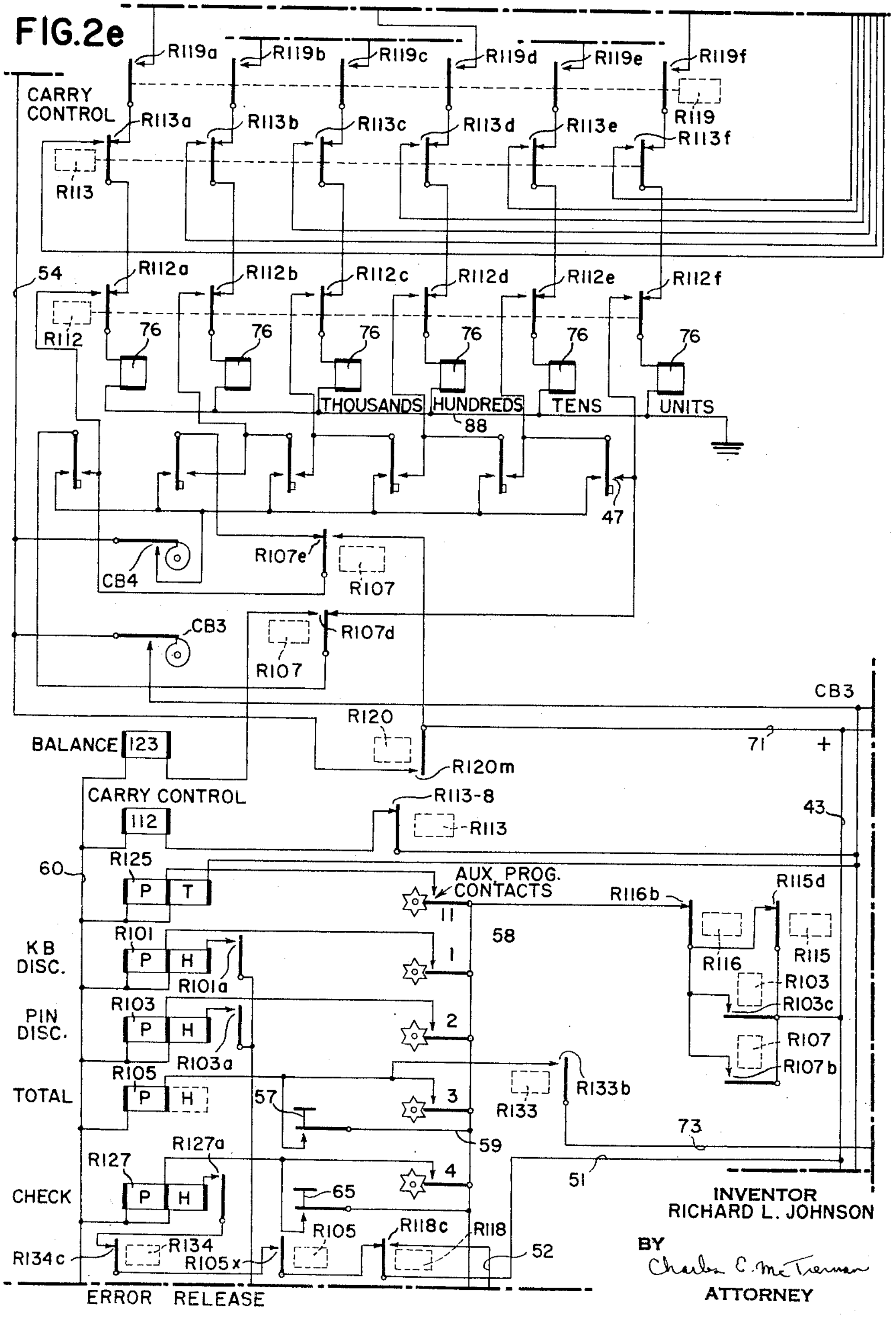
Figure 2F:
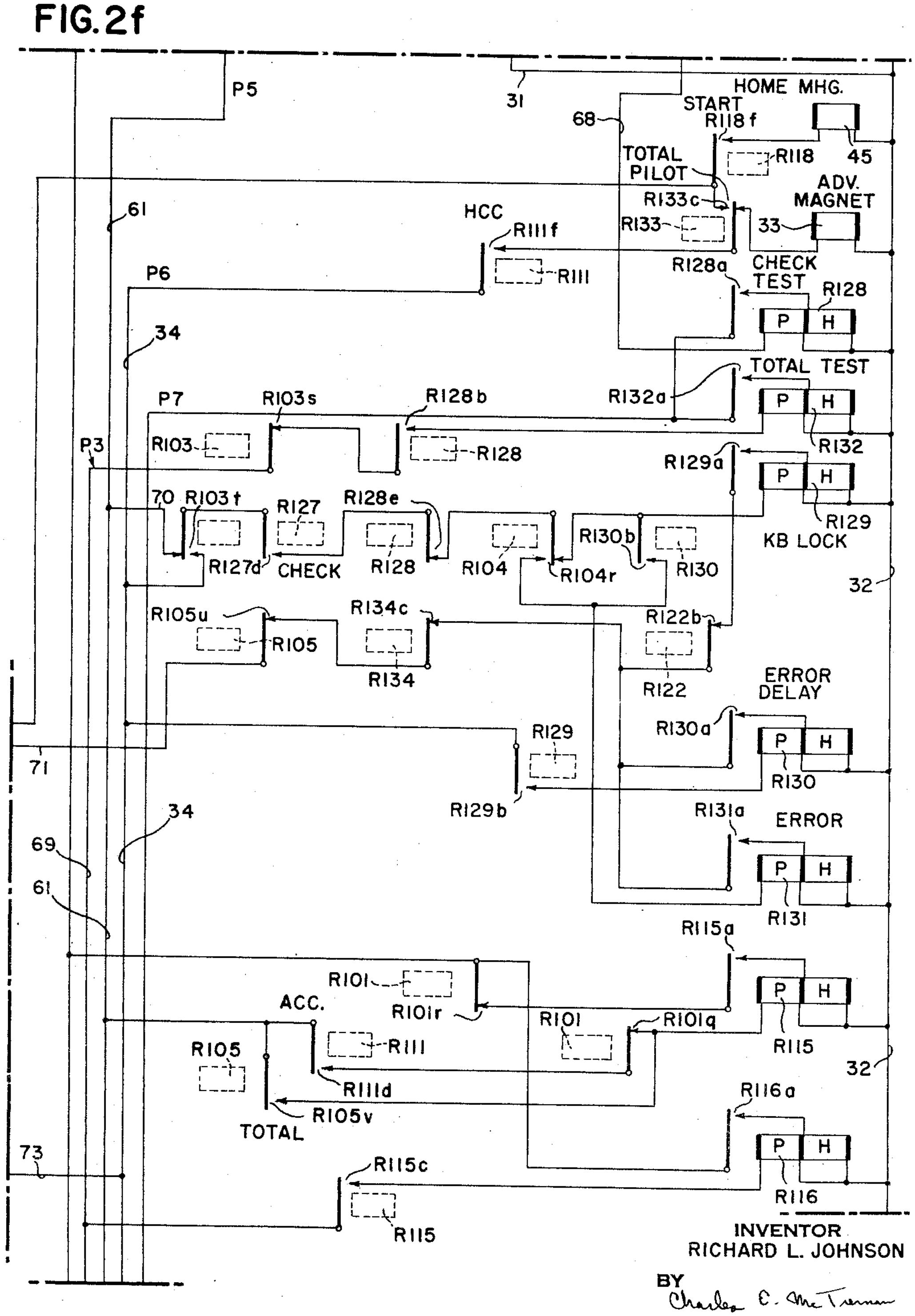
Figure 2G:
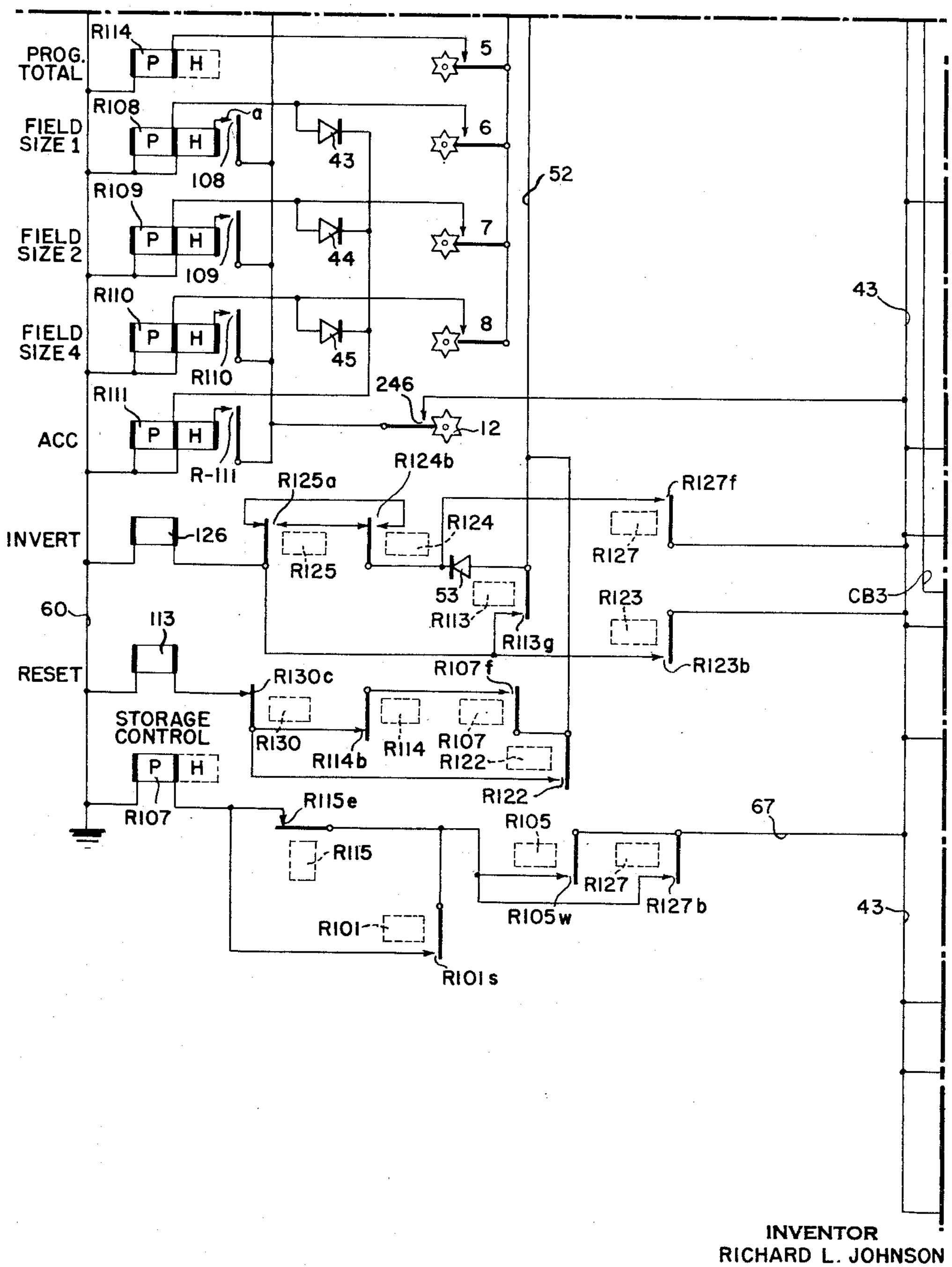
Figure 2H:
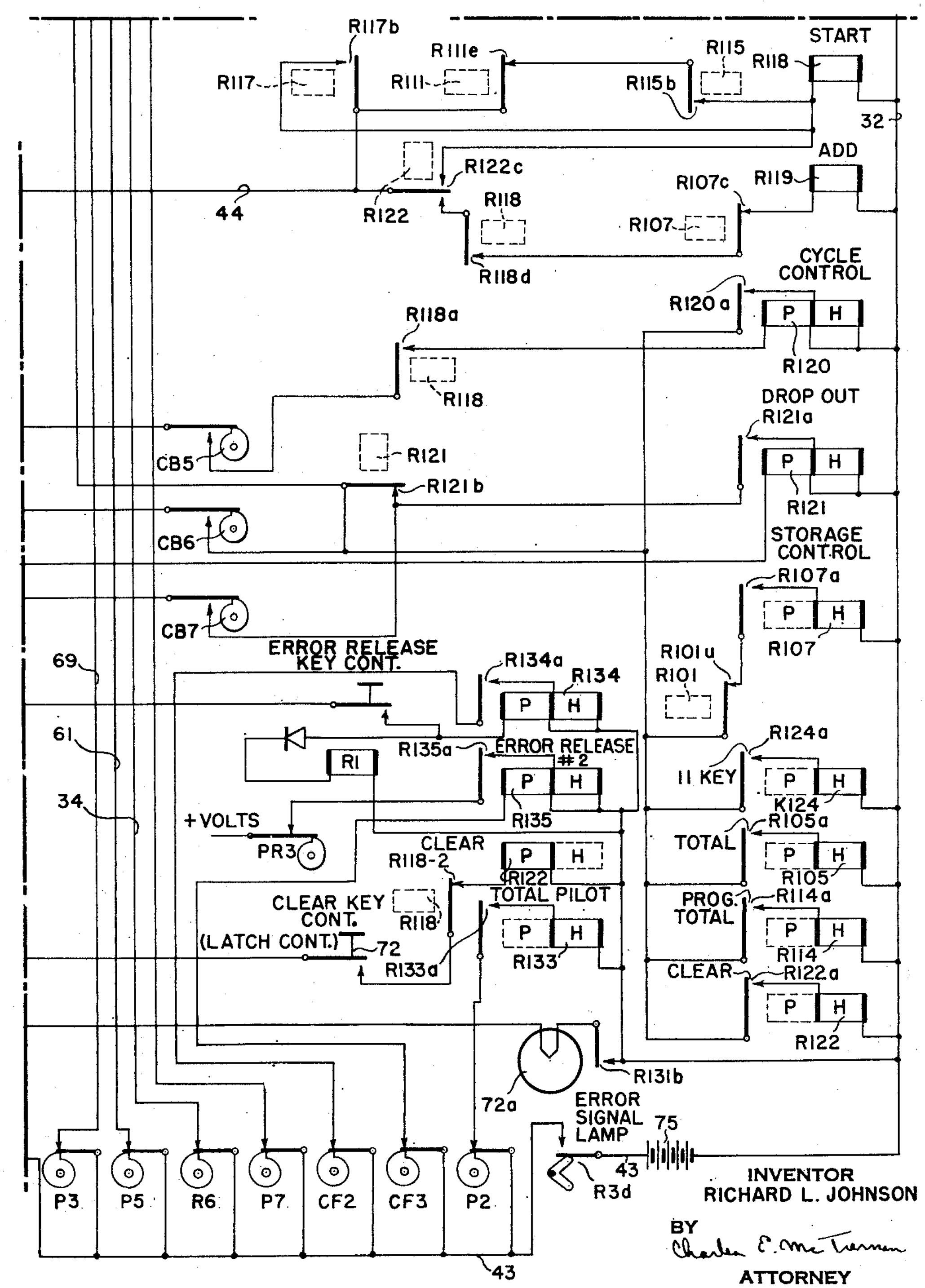

The other circuit established when the 1 key contacts 369 are closed and which will store the digit 1 may be traced as follows: line 20 (Fig. 2*a*) coupled to the high side of a source of potential not shown, line 21, the card lever contacts R3*c* now closed, the keyboard restore contacts normally closed, line 22, 1 key contacts 369 now closed, R103*d* normally closed, line 23, conductors 24 and 25 (Fig. 2*b*), rectifier, the storage relay R161 of the hundreds order, line 26 (Fig. 2*b* to Fig. 2*d*), contacts R107*i* normally closed, conductor 27, field size relay contacts R108*d* and R109*e* transferred, R110*c* as shown, the No. 1 contacts position of the stepping switch 28, contactor 29, line 30, contacts R118*e*, R132*b*, R127*c*, R105*t*, all as shown, line 31 (Fig. 2*d* to Fig. 2*f*) to the conductor 32 coupled to the negative terminal of the source of potential 75 (Fig. 2*h*). This circuit just traced will cause the storage relay R161 in the hundreds order of the relay storage unit to be energized, thus storing the highest order digit for a subsequent operation. A hold circuit for the storage relay just energized will be established by the cam controlled contacts CB6 and CB7 through the *a* contacts of this relay. The timing for the contacts CB6 and CB7 is shown in Fig. 4*b*.

There is shown in Fig. 2*b* a set of four storage relays for each of the designated orders, there being only three sets shown for the units, hundreds, and hundred thousands orders. These relays, when energized either singly or in combination, through the aid of the translating network convert the keyed digit into the 1, 2, 4 and 7 coding arrangement. It is pointed out that the last digit of each reference number assigned to the respective storage relays is indicative of the value represented by the various relays.

When the auxiliary program card escapes to column 2, a hold circuit for the field size relays R108 and R109 and the accumulate relay R111 is established through their corresponding *a* contacts by the sensing of the "12" perforation in column 2 of the auxiliary program card which closes the associated contacts 246 (Fig. 2*g*) to establish the hold circuit.

During the punch clutch cycle initiated when the 1 key was depressed, the closing of the cam controlled contacts P6 will establish a circuit for energizing the stepping switch advance magnet 33 (Fig. 2*f*), causing the stepping switch to advance to the No. 2 contacts position. This circuit is traceable as follows: line 43 (Fig. 2*h*) connected to the positive terminal of the source of potential 75, card lever contacts R3*d* now closed, the cam controlled contacts P6 now closed, line 34 (Fig. 2*h* to Fig. 2*f*), contacts R111*f* now closed, R133*c* as shown, advance magnet 33 to the negative conductor 32. Likewise, during the punch clutch cycle when the cam controlled contacts P5 make, a circuit will be established through the P5 contacts now closed, line 61 (Fig. 2*h* to Fig. 2*f*), the accumulate contacts R111*d* now closed, and the normally closed contacts R101*q* to energize the relay R115. A hold circuit for this relay is established through the contacts R101*r* and R115*a* (Fig. 2*f*) by the joint action of the cam controlled contacts CB6 and CB7 (Fig. 2*h*). When the relay R115 is energized the associated contacts R115*d* (Fig. 2*e*) will open to break the circuit to the program contacts, thus preventing these contacts from becoming effective until the proper time inasmuch as an escapment to column 2 has taken place. Thus it is seen that during this punch clutch cycle, the digit 1 will be punched in column 1 of the detail card, in the manner as explained in the Gardinor application, as well as being stored in the relay R161.

In a similar manner, the depressing of the 0 key resulting in the contacts 367 (Fig. 2*a*) being closed will cause the tens digit of the number 109 to be punched in a detail card but, unlike the initial entry, there will be no entry made in the storage relays for the value 0. The closing of the 0 contacts 367 will energize the 0 interposer magnet 188 resulting in the initiation of a punch clutch cycle, during which time the program cards will be shifted to column 3 while the detail card shifts to column 2 wherein the "0" index position will be punched. As previously described with respect to entering the highest order digit, the keyboard restore magnet 352 will also be energized.

Likewise during this punch clutch cycle, when the cam controlled contacts P6 make, a circuit will be established as previously described for energizing the stepping switch advance magnet 33. The energization of the magnet 33 will step the contactor 29 of the stepping switch 28 to the 3 contacts position. During this punch clutch cycle another circuit will be established over the now closed contacts R115*c* (Fig. 2*f*) to energize the program delay relay R116. A hold circuit for relay R116 is set up through the now closed contacts R116*a* (Fig. 2*f*) by the cam controlled contacts CB6 and CB7. This relay functions through its associated contacts to prevent program contacts of a next following column from becoming effective until the programming called for by the previous column has been completed.

The units digit of the number 109 will now be entered by depressing the 9 key which will close the 9 contacts 362 (Fig. 2*a*). The closing of the contacts 362 will establish a pair of circuits. One of these circuits will cause the 9 interposer magnet 188 to be energized, while the other of these circuits will cause the keyed digit to be stored in the 2 and 7 storage relays R142 and R147 of the units order.

As previously described, the energization of the 9 interposer magnet 188 will initiate a punch clutch cycle, during which time the "9" index position in column 3 of the detail card will be perforated as well as causing the energization of the stepping switch advance magnet 33 to step the switch contactor 29 to the 4 contacts position. The circuit established for energizing the 2 and 7 storage relays R142 and R147 of the units order is traceable as follows: conductor 20 (Fig. 2*a*) coupled to the high side of the source of potential, line 21, contacts R3*c* now closed, the keyboard restore contacts, line 22, the 9 contacts 362 now closed, contacts R103*m* as shown, line 35 (Fig. 2*a* to Fig. 2*b*), parallel circuit consisting of line 36, line 39, relay R142 of the units order, and line 37, conductor 40, storage relay R147 of the units order and then line 41 (Fig. 2*b* to Fig. 2*d*), contacts R107*g* normally closed, line 42, contacts R132*c* normally closed, contacts R108*f* now closed, R110*d* normally closed, contactor 29 in the 3 contacts position, line 30, contacts R118*e* normally closed, R132*b*, R127*c*, and R105*t* all normally closed, line 31 (Fig. 2*d* to Fig. 2*f*) and then to negative line 32. A hold circuit for these storage relays will be established through the associated *a* contacts by the joint action of the cam controlled contacts CB6 and CB7.

When the program card escapes to column 4 the hold circuit established for the field size relays R108 and R109 and the accumulate relay R111 (Fig. 2*g*) will be broken, thus restoring these relays to the normal deenergized position. As a result, the contacts R111*e* (Fig. 2*h*) will be returned to its normally closed position to establish a circuit for energizing the start relay R118 (Fig. 2*h*). The energization of relay R118 will automatically initiate an add cycle. The energization of the relay R118 will result in either the transfer or closing of all of its associated contacts. The closing of the contacts R118*a* (Fig. 2*h*) enables a circuit to be set up for applying a CB5 pulse to the relay R120 which, upon being energized, closes the contacts R120*m* (Fig. 2*e*) and transfers the remaining associated contacts (Fig. 2*c*). A hold circuit for relay R120 is established through its associated contacts R120*a* by the joint action of the cam controlled contacts CB6 and CB7. It is to be noted that the cam controlled contacts CB1 (Fig. 2*c*), CB3 and CB4 (Fig. 2*e*) are ineffective until the contacts R120*m* (Fig. 2*e*) close inasmuch as these CB contacts are coupled to the positive conductor 43 (Fig. 2*e*) through the contacts R120*m*.

The closing of the contacts R118*d* (Fig. 2*h*) will enable a circuit to be established for energizing the add relay R119 (Fig. 2*h*), causing the associated contacts R119*a*, R119*b*, R119*c*, R119*d*, R119*e* and R119*f* (Fig. 2*e*) to be closed. The closing of the contacts R118*g* (Fig. 3) will establish a circuit for energizing the keyboard restore magnet 352, causing the keyboard to be locked, thus preventing any entries being made through the manipulation of the keys during this add cycle. This circuit for energizing the magnet 352 is held until the relay R118 is deenergized.

When the relay R120 becomes energized the contacts R120*m* close to thus couple the cam controlled contacts CB1, CB3 and CB4 to the positive conductor 43 in order to enable these contacts now to become effective at the proper time as shown in the timing diagram of Fig. 4*b*. Thus the CB1 (Fig. 2*c*) contacts are now effective to apply pulses through the various positions of the impulse distributor 46 (Fig. 2*c*) over the storage relay readout network for each order to the appropriate counter magnet 76. As is well known and as described in U. S. Patent No. 2,084,560, issued to C. D. Lake on June 22, 1937, the energization of the start magnet 76 at differential times will cause the associated counter to register the values stored in the storage relays. As an example, the circuit for entering the hundreds digit stored in the storage relay R161 into the respective counter will be traced from the positive conductor 43 (Fig. 2*e*), contacts R120*m* now closed, line 54 (Fig. 2*e* to Fig. 2*c*), contacts CB1 making at "1" time, contactor 78 of the distributor 46 at the 1 contacts position, conductor 79, contacts R120*j* transferred, contacts R126*i* as shown, conductors 80 and 81, contacts R167*b*, R164*b* and R162*b* as shown, R161*b* transferred, R119*d* (Fig. 2*e*) now closed, R113*d* as shown, R112*d* as shown, magnet 76 associated with the hundreds order counter, and then to the grounded conductor 88. As is well known, the energization of the magnet 76 at "1" time will enable a 1 to be entered in the counter.

It might be added that as a result of the readout operation in which the stored digits are entered into the appropriate counter, the counters will have registered therein the number 109, while the contactors (Fig. 2*c*) for the counter emitters for the hundreds, tens and units orders will be respectively standing in the 1, 0 and 9 contacts position as shown in Fig. 2*c*. Likewise it should be noted that with a 9 standing in the units order, the associated nine's contacts 47 (Fig. 2*e*) will be closed.

After the readout operation has been completed, a CB3 pulse will be applied at the time shown in the diagram of Fig. 4*b* through the contacts R118*f* (Fig. 2*f*) to the stepping switch home magnet 45 which, upon being energized, causes the stepping switch contactor 29 to be reset to the No. 1 contacts position. This same CB3 pulse will be applied directly to the drop-out relay R121 (Fig. 2*h*). A hold circuit will be established for the relay R121 by the cam controlled contacts CB7 through the contacts R121*a*.

When the drop-out relay R121 becomes energized, the contacts R121*b* (Fig. 2*h*) open to remove the cam controlled contacts CB7 from controlling the hold circuit for various relays jointly held by the contacts CB6 and CB7 such that when the CB6 pulse terminates, the hold circuit for these relays will be broken. The breaking of the hold circuit will deenergize relay R115 which will cause its associated contacts to open, thus breaking the circuit for the relays R118, R119 and R120. The drop-out relay R121 will be deenergized when the contacts CB7 open at the end of the cycle. The program delay relay R116 will be deenergized when CB6 breaks.

Thus it becomes obvious that when relay R118 is restored to its normally deenergized condition, the contacts R118*g* (Fig. 3) will open to deenergize the keyboard restore magnet 352 thereby enabling a second number to be entered into storage by depression of the pertinent keys.

It is also pointed out that when program delay relay R116 is deenergized, the contacts R116*b* (Fig. 2*e*) are returned to a closed position, thus enabling the auxiliary program contacts to become effective in commencing the next following program operation.

*Adding without punching*

In this operation a number, such as 109, may be entered into the relay storage unit (Fig. 2*b*) and then into the counters through the successive closing of the appropriate key contacts representative of the entered digits without the number being punched in the detail card. Here also it shall be assumed that the program cards are in column 1 position while the detail card is in column 0 position.

The auxiliary program card will be prepared similarly to the auxiliary program card described in the "Adding with punching" operation in addition to containing a "1" perforation in the highest order column of the field. Thus with the auxiliary program card in column 1 position, the field size relays R108 and R109 and the accumulate relay R111 (Fig. 2*g*) will be energized in the manner as previously described, while the keyboard disconnect relay R101 (Fig. 2*e*) will be energized upon the sensing of the "1" perforation.

The energization of the keyboard disconnect relay R101 will open the associated contacts, such as R101*c* (Fig. 2*a*), for example, in the interposer magnet 188 circuits, thus preventing the punching of the keyed digit into the detail card.

The number 109 is entered in the storage relays in a manner as previously described. Inasmuch as the associated contacts of relay R101 are open, punch clutch cycles are initiated without escapement by energizing the space interposer magnet 188 (Fig. 2*a*) on each key stroke. This is made possible through the closing of the key common contacts 49 to complete a circuit through the now closed keyboard disconnect contacts R101*t* to the space magnet 188. The key common contacts 49 are closed each time any of the keys are depressed in a manner well known in the art.

With the energization of the space interposer magnet 188, the corresponding punch operating interposer 190 (Fig. 8 of the Gardinor application) closes the two interposer bail contacts 194 and 195 (Fig. 3 here) in parallel. When the bail contacts 194 and 195 close, a pair of circuits are established. One circuit which will result in the energization of the keyboard restore magnet 352 (Fig. 3) is traceable as follows: line 20, contacts R3*b* now closed, interposer contacts 194 and 195 now closed, contacts R24*d*, R23*c*, R26*c* and R24*c* normally closed, magnet 352 and then to conductor 82. The second circuit which will cause the energization of the escape interlock relay R22 (Fig. 3) is traceable as follows: conductor 20, contacts R3*b* now closed, interposer bail contacts 194 and 195, contacts R24*d* and R23*c* as shown, contacts R101*n* shifted, R105*n* as shown, escape interlock relay R22, cam controlled contacts P1, and then to the negative conductor 82. It is to be noted that the shifting of the contacts R101*n* opens the circuit to the escape magnet 104 which, when energized, normally causes an escapement to take place.

The energization of the escape interlock relay R22 closes the contacts R22$a$ causing an obvious circuit to be established for energizing the punch clutch magnet 204 (Fig. 3). As previously described, the energization of the magnet 204 initiates a punch clutch cycle.

The stepping switch advance magnet 33 (Fig. 2$f$) will be energized for each entry during a punch clutch cycle in a manner as previously described.

When the units digit of the number is keyed in, the units entry relay R117 (Fig. 2$b$) will be energized and, in turn, held through its contacts R117$a$ by the cam controlled contacts CB6 and CB7. The add cycle will be initiated by the energization of the start relay R118 (Fig. 2$h$) through a circuit established when the contacts R117$b$ (Fig. 2$h$) are closed. It is pointed out that the 0 key contacts 367 are connected directly by the conductor 83 through the normally closed contacts R115$f$ to the relay R117. This connection is necessary to take care of those situations where the units digit in an amount is zero, it being recalled that there is no provision for storing a 0 value.

The remaining steps subsequent to the energization of the start relay R118 are similar to those described for the "Adding with punching" operation and hence shall not be repeated.

*Subtraction*

Whenever it is desired to enter an amount such as 109, for example, into the counter subtractively, the operator will depress the 11 key to close the contacts 420 (Fig. 2$a$) prior to keying or entering an amount into storage. The closing of the contacts 420 will establish an obvious circuit through the shifted contacts R111$c$ to energize the relay R124 (Fig. 2$a$). A hold circuit for this relay is established through the contacts R124$a$ (Fig. 2$h$) by the cam controlled contacts CB6 and CB7.

As previously described under the heading titled "Adding with punching," the amount, such as 109, will be entered, stored and the start relay R118 (Fig. 2$h$) will be energized.

The energization of the start relay R118 will, in the manner as previously described, initiate an add cycle as well as establish a circuit for energizing the invert relay R126 (Fig. 2$g$), resulting in the transferring of the associated contacts R126$a$, R126$b$, R126$c$, R126$d$, R126$e$, R126$f$, R126$g$, R126$h$, R126$i$ and R126$j$ (Fig. 2$c$). This circuit may be traced as follows: positive conductor 43 (Fig. 2$e$) line 51, contacts R118$c$ shifted, line 52 (Fig. 2$e$ to Fig. 2$g$), rectifier 53, contacts R124$b$ shifted, R125$a$ as shown, invert relay R126 and then to the grounded conductor 60.

With the invert relay R126 now energized, the associated contacts will direct the distributor 46 impulses to the storage readout such that the complement amount will be added into the counter. This may be shown by tracing the completed circuit through the storage readout for the hundreds digit of the number 109 where it is assumed that such number has been entered in the storage relays and that an add cycle has been initiated. The circuit is as follows: conductor 43 (Fig. 2$e$), contacts R120$m$ now closed, conductor 54 (Fig. 2$e$ to Fig. 2$c$), cam controlled contacts CB1, contacts position 8 of the impulse distributor 46, contactor 78, contacts R120$c$ shifted, conductors 55 and 56, contacts R126$i$ shifted, conductor 80, conductor 81, contacts R167$b$, R164$b$, R162$b$ all as shown, R161$b$ shifted, contacts R119$d$ (Fig. 2$e$) now shifted, R113$d$ as shown, R112$d$ as shown, start magnet 76 of the hundreds order and then to grounded conductor 88. The energization of the start magnet 76 at "8" time will result in an 8 being entered in the counter which represents the nines complement of the hundreds digit of the amount 109.

*Total punching*

After entering various amounts in the counters, the operator may cause to be punched in the total field the sum of the various entered amounts either manually through the manipulation of the total key 57 (Fig. 2$e$) or automatically by programming such in the auxiliary program card, or the progressive total of said amounts by programming such in the auxiliary program card. In this description the total assumed shall be the number 109.

In the situation where the total will be punched in the total field of the detail card through the manual manipulation of the key 57, the auxiliary program card would be punched with a "6" and a "7" in the first column of the total field to represent an assumed anticipated total field of three digits. The remaining two columns of the auxiliary program card will be punched with a "12." It is obvious that the total field of the program card may be programmed for any desired total field.

The "6" and "7" perforations in the first column of the total field as represented in the auxiliary program card upon being sensed will cause the field size relays R108 and R109 and the accumulate relay R111 (Fig. 2$g$) to be energized. The operator, in closing the total key 57 (Fig. 2$e$), will now complete a circuit for energizing the total relay R105 (Fig. 2$e$) which is traceable as follows: positive line 43 (Fig 2$e$), contacts R115$d$ and R116$b$ normally closed, conductors 58 and 59, total key 57 contacts now closed, pickup coil of total relay R105 and then to grounded conductor 60. A hold circuit for relay R105 is established through its associated contacts R105$a$ (Fig. 2$h$) by the cam controlled contacts CB6 and CB7.

The contacts R105$w$ (Fig. 2$g$) will close when the relay R105 is energized to set up a circuit for energizing the storage control relay R107 (Fig. 2$g$) which is traceable as follows: conductor 43, contacts R105$w$ now closed, R115$e$ normally closed, pickup coil of relay R107 and then to conductor 60. A hold circuit for relay R107 is set up through its associated contacts R107$a$ (Fig-2$h$) and the contacts R101$u$ by the cam controlled contacts CB6 and CB7.

The contacts R105$q$ (Fig. 3) also close with the energization of the relay R105 to establish a circuit for energizing the punch clutch magnet 204. This circuit is traceable as follows: positive conductor 20, contacts R115$g$ as shown, R105$q$ now closed, punch clutch magnet 204, cam controlled contacts P1 and then to grounded conductor 82.

The energization of the punch clutch magnet 204 initiates a punch clutch cycle such that when the contacts P5 make a circuit is established to energize the relay R115 (Fig. 2$f$) over the now closed contacts R105$v$ (Fig. 2$f$). Relay R115 will be held energized until the end of reset cycle through its associated contactor R115$a$ (Fig. 2$f$) by the cam controlled contacts CB6 and CB7. Attention is directed to the fact that this punch clutch cycle is not preceded by an escapement.

A second circuit will be established when the contacts P5 close for energizing the 1 interposer magnet 188. This circuit is traceable as follows: line 43 (Fig. 2$h$), now closed card lever contacts R3$d$, P5 contacts now closed, conductor 61 (Figs. 2$h$, 2$f$ and 2$d$), contacts R105$t$ transferred, R127$c$, R132$b$, R118$e$ all as shown, conductor 30, contactor 29 of switch 28 in No. 1 contacts position, R110$c$ as shown, R109$e$ and R108$d$ shifted, line 27, contacts R107$i$ transferred, conductor 62 (Fig. 2$d$ to Fig. 2$c$), hundreds order emitter common 63, associated contactor 85 in the No. 1 contacts position, R126$i$ and R120$j$ as shown, line 64 (Fig. 2$c$ to Fig. 2$a$), contacts R105$d$ shifted, 1 interposer magnet 188 and then to ground. As previously described, the energization of the interposer magnet will initiate an escapement and a punch clutch cycle such that the program cards will be spaced to the second column of the total field, while the detail card will be spaced to the first column of the total field wherein a "1" will be punched. Concurrent with the energization of the 1 magnet 188, a P5 impulse will also be applied to the stepping switch advance magnet 33 causing the same to be energized and resulting in the contactor 29 being stepped to the second contacts position.

During the punch clutch cycle initiated when the magnet 188 is energized, a P3 impulse will be applied over the now closed contacts R115*c* (Fig. 2*f*) to pick up the program delay relay R116 (Fig. 2*f*), a P5 impulse will be applied over the stepping switch 28 in the 2 contacts position to pick up the 0 magnet 188 which, in turn, will initiate a punch clutch cycle, while a P6 impulse will be applied to the advance magnet 33 to step the contactor 29 to the 3 contacts position. As previously described, the initiating of the punch clutch cycle when the 0 magnet 188 is energized will cause the program cards to escape to column 3 and the detail cards to column 2 wherein the 0 index position will be punched.

During the punch clutch cycle initiated when the 0 magnet 188 is energized, a P5 impulse will be applied over the stepping switch 28 in the 3 contacts position to energize the 9 magnet 188 which, in turn, will initiate a punch clutch cycle for causing the program cards to escape outside of the total field to column 4 while the detail card will escape to column 3 wherein a 9 will be punched. Likewise during this cycle the advance magnet 33 will be energized causing the contactor to be stepped to the 4 contacts position.

When escapement to the column outside of the total field of the program cards take place, the field definition 12 star-wheel contacts 246 (Fig. 2*g*) will open to break the hold circuit for the field size relays R108 and R109 and the accumulate relay R111 (Fig. 2*g*).

The deenergization of the relay R111 at this time will establish a circuit through the normally closed contacts R111*e* (Fig. 2*h*) and the now closed contacts R115*b* for energizing the start relay R118 (Fig. 2*h*). The energization of relay R118 shifts the contacts R118*c* (Fig. 2*e*) to complete a circuit for energizing the reset relay R113 (Fig. 2*g*). This circuit is traceable as follows: positive conductor 43, conductor 51 (Fig. 2*e*), R118*c* transferred, conductor 52 (Fig. 2*e* to Fig. 2*g*), contacts R107*f* now closed, R114*b* and R130*c* normally closed, relay R113 and then to the grounded conductor 60. As previously described, contacts R118*a* now closed will cause the cycle control relay R120 to be energized which, in turn, through the closing of the contacts R120*m* (Fig. 2*e*) will cause the drop-out relay R121 to be energized at the time CB3 makes.

The energization of reset relay R113 (Fig. 2*g*) will close the contacts R113*g* (Fig. 2*g*) to set up a circuit for energizing the invert relay R126. With the cycle control relay R120 now energized, the impulse distributor 46 becomes effective in applying pulses over the respective contacts R120*b* to R120*k*, the corresponding contacts R126*a* to R126*j* (Fig. 2*c*), the emitter contacts, the storage relay network and the respective contacts R113*a* to R113*f* to reset the counter to a nine's basis in a well known manner.

If it is desired that progressive totals be recorded in the detail cards, then the resetting of the counters will be suppressed by punching a "5" in the high order position of the total field located in the auxiliary program card. Thus when the "5" program contacts (Fig. 2*g*) are closed, a circuit will be established for energizing the progressive total relay R114 which will be held energized by cam controlled contacts CB6 and CB7 through the contacts R114*a* (Fig. 2*h*). Now when the start relay R118 is energized, the circuit which would normally be completed to the reset relay R113 during a total punching operation will not be completed inasmuch as the contacts R114*b* (Fig. 2*g*) are now opened. Thus the cycle will continue with the counter start magnets 76 not being reset. It is to be noted that the "5" index position may be punched in any total field column of the auxiliary program card in order to suppress resetting.

It is also possible to automatically initiate an automatic total punching cycle. This may be brought about by perforating the "3" index point position in the high order position of the total field located in the auxiliary program card. Thus when the "3" perforation is sensed by the corresponding star-wheel, a circuit will be established for energizing the total relay R105 (Fig. 2*e*). With the relay R105 now energized, the total punching operation will take place in the manner as previously described.

It is to be noted in an automatic total punching operation that if the preceding field was an add and punch field, the electrical circuit to the auxiliary program contacts common will be opened by contacts R115*d* (Fig. 2*e*) and will remain open until completion of the add cycle. Thus the punching of the total will not take place as the 3 program contact closes, but will be delayed until completion of the add cycle.

*Checking from keyboard*

In order to check the accuracy of a previously entered or calculated amount standing in the counters with a pre-existing amount obtained by other methods, it is necessary that the auxiliary program card contain a "1," a "6," and a "7" perforation in the highest order column, it being assumed that the operator desires to check the amount 109. The sensing of the "1" perforation will cause the energization of the keyboard disconnect key relay R101 (Fig. 2*e*) in a manner as previously described.

The relay R101 upon being energized will open its associated contacts, such as R101*c* (Fig. 2*a*) in the interposer magnet 188 circuits, thus preventing the energization of the corresponding interposer magnet upon the closing of the associated key contacts.

The sensing of the "6" and "7" perforations in the highest order column of the auxiliary program card will establish a circuit for energizing the field size relays R108 and R109 as well as accumulate relay R111 (Fig. 2*g*). These relays will be held energized in a manner as previously described.

The checking operation is initiated by depressing the check key 65 (Fig. 2*e*) to establish an obvious circuit for energizing the check relay R127. A hold circuit for the relay R127 will be established through the following circuit: positive conductor 43 (Fig. 2*e*), line 51, contacts R118*c*, as shown, R105*x* and R134*c* each as shown, R127*a* now closed, and the hold coil of the relay R127 to the grounded line 60. With the energization of the relay R127 the associated contacts R127*b* (Fig. 2*g*) will close to establish a circuit for energizing the storage control relay R107 (Fig. 2*g*). This circuit is traceable as follows: conductor 43, line 67, contacts R127*b* now closed, R115*e* as shown, pickup coil of the relay R107 and then to the line 60. Due to the fact that the contacts R101*u* (Fig. 2*h*) are open, thus preventing the energization of the hold coil of the relay R107, the pickup circuit of relay R107 will function as a hold circuit.

Inasmuch as the operator desires to check the amount 109 standing in the counter, the key representative of the highest order digit thereof will be depressed. The depression of the 1 key will establish a pair of circuits, one of which will result in the energization of the space interposer magnet 188 (Fig. 2*a*), while the other will cause the energization of the check test relay R128 (Fig. 2*f*). The circuit established for energizing the space interposer magnet 188 and the resulting operations have been previously described and need not be repeated here. Suffice it to say that upon energizing the space interposer magnet 188, the program cards will escape to the next lower order column and a punch clutch cycle will be initiated.

The circuit established for energizing the check test relay R128 is traceable as follows: positive conductor 20 (Fig. 2*a*), line 21, contacts R3*c* now closed, the keyboard restore contacts, the 1 contacts 369, R103*d* as shown, line 23, contacts R105*d* as shown, line 64 (Fig.

2a to Fig. 2c), contacts R120j as shown, R126i as shown, emitter contactor 85, the hundreds order emitter common 63, conductor 62 (Fig. 2c to Fig. 2d), contacts R107i transferred, line 27, contacts R108d and R109e each transferred, R110c as shown, No. 1 contacts position of the stepping switch 28, contactor 29, line 30, contacts R118e as shown, R132b as shown, R127c shifted, line 68 (Fig. 2d to Fig. 2f), pickup coil of the check test relay R128 and then to the grounded conductor 32. A hold circuit for the relay R128 is established through its associated contacts R128a by the cam controlled contacts P7 which make during the punch clutch cycle initiated when the space interposer magnet 188 was energized.

During the punch clutch cycle initiated when the space interposer magnet 188 was energized, a circuit will be completed when the cam controlled contacts P3 make for energizing the total test relay R132 (Fig. 2f). This circuit is traceable as follows: conductor 43 (Fig. 2h), P3 contacts now closed, conductor 69 (Fig. 2h to Fig. 2f) contacts R103s as shown, contacts R128b now closed, the pickup coil of the relay R132 and then to conductor 32. A hold circuit for this relay will be set up by the cam controlled contacts P7 through the contacts R132a. When the P6 contacts close, the advance magnet 33 will be energized causing the stepping switch to be advanced to the next contacts position in a manner such as previously described. When the cam controlled contacts P7 break, the relays R128 and R132 will be restored to the normally deenergized position. In like manner, the remaining two digits will be entered in the keyboard for the purpose of checking the remaining two orders of the amount 109 standing in the counters.

Should any keyed digit fail to match or agree with the setting of the counter position being tested, the check test relay R128 will not be picked up inasmuch as no complete circuit will be established thereto. The keyboard lock relay R129 (Fig. 2f) will be picked up in place of the check test relay R128 during the punch clutch cycle. The relay R129 upon being energized will cause, through its associated contacts, the energization of the keyboard restore magnet 352 (Fig. 3), thus locking the keyboard and preventing further entries being made. The circuit established for energizing the relay R129 (Fig. 2f) may be traced as follows: conductor 43 (Fig. 2h), the P5 cam contacts now closed, conductor 61 (Fig. 2h to Fig. 2f), line 70, contacts R103t as shown, contacts R127d closed, R128c as shown, R103r as shown, pickup coil of relay R129 and then to negative conductor 32. A hold circuit for the relay R129 will be established by the following circuit: conductor 43 (Fig. 2e), line 71 (Fig. 2e to Fig. 2f), contacts R105u, R134c and R122b, all as shown, R129a now closed, the hold coil of the relay R129 and then to the conductor 32. With the contacts R129b (Fig. 2f) now closed, an obvious circuit will be set up when the cam controlled contacts P6 make as shown in the timing diagram of Fig. 4b for energizing the error delay relay R130 (Fig. 2f). A hold circuit for the relay R130 will be set up as follows: conductor 43, line 71 (Fig. 2e to Fig. 2f), contacts R105u and R134c as shown, contacts R130a now closed, the hold coil of the relay R130 and then to the conductor 32.

The circuit established for energizing the keyboard restore magnet 352 is traceable as follows: conductor 20 (Fig. 3), contacts R129c now closed, the magnet 352 and then to the conductor 82. With the keyboard now locked due to the detecting of an incorrect entry, the depression of the clear key 72 (Fig. 2h) will establish a circuit for energizing the clear relay R122 (Fig. 2h) which, in turn, will set up further circuits for the homing of the stepping switch 28 (Fig. 2d) and unlocking of the keyboard without resetting the counters.

A hold circuit for the relay R122 will be set up through its associated contacts R122a by the cam controlled contacts CB6 and CB7. The contacts R122b (Fig. 2f) open with the energization of the relay R122 to thus break the hold circuit on a keyboard lock relay R129. The contacts R122c (Fig. 2h) will transfer to complete an obvious circuit for energizing the start relay R118 (Fig. 2h). The keyboard restore magnet 352 will not drop out with the opening of the contacts R129c inasmuch as this circuit will still be completed through the now closed contacts R118e until R118 drops out at the end of the clear cycle. The home magnet 45 (Fig. 2f) of the stepping switch will be energized by a circuit established through the now closed contacts R118f to return the stepping switch contactor to its No. 1 contacts position. The check amount may now be rekeyed to determine if any keyed digit again fails to match the counter position being tested. This double check operation will determine whether the error was caused by the operator's keying or the keyed amount does not favorably compare with the entered amount.

If it be assumed that the keyed amount and the amount standing in the counter do not favorably compare then the operator will, upon rekeying, find once again that the check test relay R128 will fail to pick up as previously mentioned. However, a circuit will now be completed to energize the error relay R131 (Fig. 2f) when the cam controlled contacts P5 make, which may be traced as follows: conductor 43 (Fig. 2h), cam controlled contacts P5 now closed, conductor 61 (Fig. 2h to Fig. 2f), line 70, contacts R103t as shown, R127d now closed, R128c as shown, R103r as shown, R130b now closed, the pickup coil of the error relay R131 and then to the conductor 32. A hold circuit for relay R131 is set up through the contacts R105u and R134c as shown, and the now closed contacts R131a.

With the energization of the error relay R131, the contacts R131b (Fig. 2h) will close to complete a circuit for illuminating the error signal lamp 72a (Fig. 2h) to indicate an erroneous entry.

When the units position of the amount being checked is reached without an error being indicated or detected, a circuit will be completed when the cam controlled contacts P5 make to energize the total pilot relay R133 (Fig. 2d). This circuit is traceable as follows: positive conductor 43 (Fig. 2h), the cam controlled contacts P5 now closed, conductor 61 (Figs. 2h, 2f, 7 and 2d), the total test relay contacts R132b transferred, the start relay contacts R118e as shown, conductor 30, contactor 29 of the stepping switch 28 now in the No. 3 contacts position, contacts R110d as shown, R108f shifted, R132c now transferred, the pickup coil of the relay R133 and then to the conductor 32. A hold circuit for the relay R133 will be set up by the P2 cam controlled contacts through the now closed contacts R133a (Fig. 2h).

When the cam controlled contacts P6 make, a circuit will be established through the now closed contacts R133b (Fig. 2e) for energizing the total relay R105. This circuit may be traced as follows: positive conductor 43 (Fig. 2h), the cam controlled contacts P6 now closed, conductor 34 (Fig. 2h to Fig. 2f), conductor 73 (Fig. 2f to Fig. 2e), contacts R133b now closed, to the pickup coil of the relay R105 and then to the grounded conductor 60. At the same time, the stepping switch will be homed due to the energization of the magnet 45 by a circuit which is traceable from line 34 (Fig. 2f) as follows: the accumulate relay contacts R111f now closed, R133c shifted, the magnet 45 and then to the conductor 32. Total punching will now take place in a manner as previously described under the title "Total punching."

*Add from pins*

In order to carry out this operation it must be assumed initially that a leading detail card, which henceforth in this operation shall be called a master card, and the auxiliary program card are each in the No. 1 column position. Likewise it is assumed that the master card has represented therein the number 109, and the auxiliary program card has represented therein a "2," "6" and "7"

perforation punched in column 1 thereof, a "12" perforation in the remaining columns of the field, and the trailing detail card, which henceforth shall be called a detail card, is in column 0 position.

The sensing of the "2" perforation in column 1 of the auxiliary program card will pick up the pin disconnect relay R103 (Fig. 2*e*) which, upon being energized through its associated contacts such as R103*d* (Fig. 2*a*), will disconnect the key contacts such as contacts 367 and 369, for example, from the relay storage unit. This circuit established for energizing relay R103 may be traced as follows: positive conductor 43 (Fig. 2*e*), contacts R115*d* and R116*b* normally closed, conductor 58, the 2 starwheel contacts now closed, the pickup coil of the relay R103, and then to the grounded conductor 60.

As previously described, the sensing of the "6" and "7" perforations in column 1 of the auxiliary program card will cause the relays R108, R109 and R111 (Fig. 2*g*) to be energized. With the pin disconnect relay R103 now energized, the associated contacts R103*n* (Fig. 3) will be closed to establish an obvious circuit for energizing the punch clutch magnet 204. As previously described, the energization of the punch clutch magnet 204 will initiate a punch clutch cycle which is not preceded by an escapement operation, this cycle being referred to as a dummy punch cycle. During this cycle the sensing pin contacts which are cam driven from the punch shaft will be moved into position to sense column 1 of the master card in a manner as described in the Gardinor et al. application.

During this dummy cycle when the cam controlled contacts P5 make, a circuit will be established for energizing the relay R115 (Fig. 2*f*) in a manner as previously described. The energization of the relay R115 will open the associated contacts R115*g* (Fig. 3) which will prevent further dummy cycles from being initiated. As usual, the relay R115 will be held energized through the alternate making and breaking of the cam controlled contacts CB6 and CB7. Simultaneously, the closing of the P5 contacts (Fig. 2*a*) will establish a circuit through the No. 1 pin contacts 223 (Fig. 2*a*) to store the number in the storage relay R161 (Fig. 2*b*). This circuit may be traced as follows: positive conductor 20 (Fig. 2*a*), contacts R3*c* now closed, the cam controlled contacts P5 now closed, contacts R9*c* normally closed, R103*p* now closed, 1 pin contacts 223, conductor 23 (Fig. 2*a* to Fig. 2*b*), conductor 24, conductor 25, pickup coil of relay R161, conductor 26 (Fig. 2*b* to Fig. 2*d*), the contacts R107*i* normally closed, conductor 27, contacts R108*d* transferred, contacts R109*e* transferred, R110*c* as shown, the No. 1 contacts of the stepping switch 28, the contactor 29, line 30, contacts R118*e*, R132*b*, R127*c* and R105*t*, each as shown, line 31, and then to the grounded conductor 32.

Likewise during this dummy punch clutch cycle, the P6 contacts upon closing will establish a circuit for energizing the advance magnet 33 (Fig. 2*f*) to cause the stepping switch contactor 29 to be stepped to contacts position No. 2 in a manner as previously described. The operator will now key each digit to be entered into the detail card. As the operator keys each digit, causing the energization of the associated interposer magnet, escapement and punching in the detail card takes place in a normal manner accompanied by a sensing pin operation which results in storage of the amount in the master card into the relay storage unit.

Inasmuch as in this operation the master card is being sensed or read one column displaced or ahead of the punching in the detail card, the units digit in the master card is read as the tens digit is punched in the detail card and no reading or sensing of the master card should take place as the units digit is punched in the detail card. This is true inasmuch as the pin disconnect relay R103 drops out during escapement as the field definition 12 program contacts open prior to the units digit punch cycle. The add cycle is initiated when the accumulate relay contacts R111*e* (Fig. 2*h*) are restored to the normally closed position, causing the energization of the start relay R118. The remaining operating steps are similar to those described with respect to the "add and punch" operation and shall not be repeated here.

*Checking from pins*

After the add cycle has been terminated the calculated total is now standing in the appropriate counters. The checking of the existing total previously punched in the master card with the calculated total standing in the counters will now take place.

In order to be able to initiate this checking operation the first column of the total field of the auxiliary program card will have the "2," "4," "6" and "7" index point positions perforated, while the remaining columns of the total field will have a "12" punched therein. Thus when the auxiliary program card escapes to the first column of the total field and after the termination of the add cycle, the "2," "4," "6" and "7" upon being sensed will respectively cause the energization of the relays R103, R127, R108, R109 and R111.

As previously described, the energization of the pin disconnect relay R103 (Fig. 2*e*) will open the circuits from the key contacts to the relay storage unit, and through contacts R103*n* (Fig. 3) will initiate a dummy punch clutch cycle. The energization of the check relay R127 will close the associated contacts R127*b* (Fig. 2*g*) to establish an obvious circuit for energizing the storage control relay R107 which, in turn, upon being energized will close the associated contacts R107*g*, R107*h*, R107*i*, R107*j*, R107*k*, R107*m* (Fig. 2*d*), all to be transferred.

During the dummy punch cycle the sensing pin contacts, which are cam driven from the punch shaft, will be moved into position to sense column 1 of the total field master card so as to enable a circuit to be established when the P5 cam contacts close during this cycle for the comparing of the highest order digit of the existing total with calculated total.

The comparing or checking circuit established when the cam controlled contacts P5 make may be traced as follows: the positive conductor 20 (Fig. 2*a*), contacts R3*c* now closed, contacts P5 now closed, contacts R9*c*, R103*p* now closed, 1 pin contacts 223 now closed, line 23, contacts R105*d* as shown, line 64 (Fig. 2*a* to Fig. 2*c*), contacts R120*j*, R126*i* each as shown, contactor 85 of the hundreds emitter, common conductor 63, conductor 62 (Fig. 2*c* to Fig. 2*d*), contacts R107*i* transferred, conductor 27, R108*d* and R109*e* each transferred, R110*c* as shown, No. 1 contacts of the stepping switch 28, contactor 29, line 30, contacts R118*e* as shown, R132*b*, contacts R127*c* shifted, conductor 68 to the pickup coil of the check test relay R128, and then to the negative conductor 32.

Simultaneous with the checking of the highest order digits of the existing total with the calculated total, the P5 pulse will be applied to the relay R115 (Fig. 2*f*) causing the energization of same. As previously described, the energization of the relay R115 opens the associated contacts R115*f* to prevent further dummy cycles from taking place. This relay will be held through subsequent operations by the alternate making and breaking of the cam controlled contacts CB6 and CB7. Likewise during this dummy punch clutch cycle when the cam controlled contacts P6 make, a circuit will be established to energize the advance magnet 33 (Fig. 2*f*) to step the stepping switch contactor 29 to contacts position No. 2. The remaining operations are similar to that as previously described.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A device of the class described comprising a group of sets of denominationally ordered storage devices, each said sets comprising four relays which when energized singly or in combination represent the digits 1 to 9, accumulator means having a plurality of denominational orders, a program device, means under control of said program device for selectively positioning a network of contacts according to the size of the field of a multi-digit amount to be stored in said devices, stepping switch means, means for simultaneously entering said amount successively digit by digit in a record card and said storage means, said entering of said amount in said storage means being controlled by said switch means and said network for enabling said entered digits to be entered in the appropriate one of said sets, and means upon completion of entering said amount for reading out said stored digits into the corresponding order of said accumulator.

2. A device of the class described comprising a plurality of sets of denominationally ordered storage devices, each said sets comprising a plurality of relays which when energized singly or in combination represent the digits 1 to 9, a program device, a network of contacts controlled by said program device to assume a settable position representative of the field size of an amount to be entered, said network having a plurality of inputs coupled to the corresponding one of said sets of storage devices, switch means having a contactor operated step by step to successive contacts positions, said network having a plurality of outputs respectively coupled to said contacts positions in a descending order, means for entering said amount successively digit by digit into said storage devices, said switch upon being operated step by step causing the entered digit to be entered in the appropriate order of said storage devices.

3. A device of the class described comprising denominationally ordered devices successively settable to represent a multidigit amount, a program device, a network of contacts controlled by said program device to assume a settable position representative of the field size of said amount, switch means having a contactor operated step by step to successive contacts positions, said switch means having a plurality of output connections coupled respectively to said positions such that as said switch is stepped successively the digits of said amount will be set in the appropriate one of said devices.

4. A device of the class described comprising a plurality of sets of denominationally ordered storage devices, each said sets comprising a plurality of relays which when energized singly or in combination represent the digits 1 to 9, accumulator means having a plurality of denominational orders, program means, means under the control of said program means for selectively positioning a network of settable elements according to the size of the field of a multidigit amount to be stored in said devices, said network having a plurality of inputs coupled to the corresponding one of said sets of devices, switch means having a contactor operated step by step to successive contacts positions, said network having a plurality of output connections respectively coupled to said contacts positions, means for entering said amount successively digit by digit into said storage devices, means controlled by said entering means for causing said switch to be operated step by step for enabling the entered digit to be stored in the appropriate set of said storage devices, and pulse means rendered effective upon the last digit of said amount being entered into said devices for transferring said amount into said accumulator.

5. A device of the class described comprising denominationally ordered storage devices, accumulator means having a plurality of denominational orders, a program device, means under control of said program device for selectively positioning a network of contacts according to the size of the field of a multidigit amount to be stored in said devices, switch means having a contactor operated step by step to successive contacts positions, said network intercoupling said devices to respective ones of said positions, means for entering said amount successively digit by digit into said devices, said entering means for each digit entered causing cycles of operation to be initiated, said switch being operated during each cycle of operation to enable each entered digit to be stored in the appropriate order of said devices, and pulse means made effective upon the entering of the last digit of said amount in said devices for transferring said amount into said accumulator.

6. A device of the class described comprising denominationally ordered storage devices, a program device, means under control of said program device for selectively positioning a network of contacts according to the size of the field of a multidigit amount to be stored in said devices, switch means having a contactor operated step by step to successive contacts positions, said network intercoupling said devices to respective ones of said positions, means for entering said amount successively digit by digit into said devices, said entering means for each digit entered causing cycles of operation to be initiated, said switch being operated during each cycle of operation to enable each entered digit to be stored in the appropriate order of said devices.

References Cited in the file of this patent

UNITED STATES PATENTS 2,493,858 Carroll et al. ---------- Jan. 10, 1950